United States Patent [19]

Clark

[11] Patent Number: 5,157,860

[45] Date of Patent: Oct. 27, 1992

[54] FISHING WEIGHT

[76] Inventor: Thomas C. Clark, Rte. 1, Box 137, Hampton, Fla. 32044

[21] Appl. No.: 745,160

[22] Filed: Aug. 15, 1991

[51] Int. Cl.⁵ ............................................. A01K 91/00
[52] U.S. Cl. .................................. 43/44.9; 43/44.91; 43/43.12
[58] Field of Search ................... 43/44.9, 44.91, 44.92, 43/44.89, 43.12

[56] References Cited

U.S. PATENT DOCUMENTS

| | | | |
|---|---|---|---|
| 3,273,278 | 9/1966 | Lynch | 43/44.9 X |
| 4,279,092 | 7/1981 | Hutson | 43/44.91 |
| 4,615,136 | 10/1986 | Bank | 43/44.91 |
| 5,027,545 | 7/1991 | Lowrie et al. | 43/43.12 X |

FOREIGN PATENT DOCUMENTS 0236996  2/1959  Australia ............................ 43/44.91

Primary Examiner—Richard K. Seidel
Assistant Examiner—Patty E. Hong
Attorney, Agent, or Firm—Arthur G. Yeager

[57] ABSTRACT

A fishing weight having a body with a central through bore large enough to receive a fishing line therein along a central axis and a radial slot extending from the bore outwardly to the outer surface of the body, and a resilient, slightly compressible insert of substantially the same size as the slot and adapted to be manually pushed therein, the insert having a small tab extending rearwardly from the body and adapted to be a catch for a fingernail when prying the insert out of the slot.

15 Claims, 1 Drawing Sheet

FISHING WEIGHT

BACKGROUND OF THE INVENTION

Fishing weights are small articles of lead, brass or other heavy material, that can be attached to and removed from a fishing line to submerge the bait to whatever depth may be chosen by the fisherman. It sometimes is desirable to attach the weight so that it freely slides along the fishing line, and other times it is desirable to attach the weight so that it will remain at a chosen location on the line. In most instances it is desirable that the weight is capable of being quickly attached or removed from the line and is reusable.

Many inventors in the prior art have suggested weights that have some or all of the above features, but in those having all of these features, the device has been complex and/or expensive. Typical of the prior art are U.S. Pat. Nos. 3,096,599; 4,235,037; 4,279,092; 4,615,136; and 4,691,468.

It is an object of this invention to provide a simple fishing weight which can be made slidable or nonslidable by a slight manual adjustment. It is another object of this invention to provide a novel fishing weight that readily disassembles without need for a tool. Still other objects will become apparent from the more detailed description which follows.

BRIEF SUMMARY OF THE INVENTION

The invention relates to fishing weight comprising a body having a longitudinal central axis and a through bore along said axis, said body being made of a material having a specific gravity greater than one and having a radial slot extending from said bore to the outside of said body for the complete length of said bore; and a resilient slightly compressible insert having a thickness, length and width substantially equal to the corresponding dimensions of said slot, said insert including a small tab extending axially beyond one end of said slot to provide a fingernail catch for use in prying said insert out of said slot.

In specific and preferred embodiments of the invention the body is made of lead and insert is made of a thermoplastic material or hard rubber and is slightly larger in overall dimensions than those of the slot into which it is engaged.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
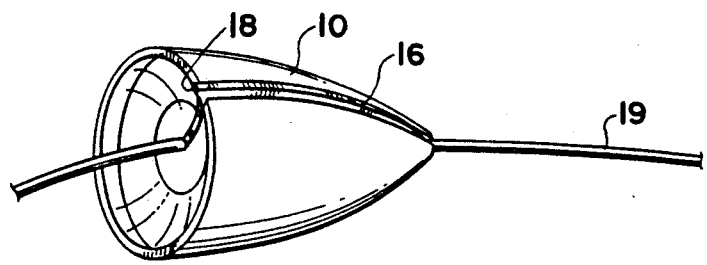
FIG. 1 is a perspective view of the fishing weight of this invention attached to a fishing line.
Figures 2, 3:
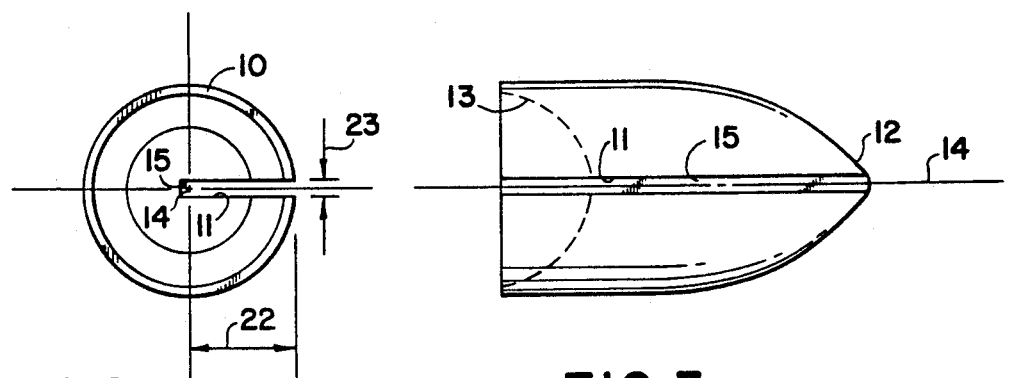
FIG. 2 is a bottom plan view of the body of the fishing weight of this invention.
FIG. 3 is a front elevational view of the body of the fishing weight of this invention.
Figure 4:
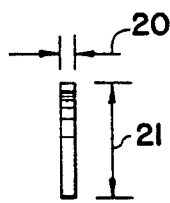
FIG. 4 is an end elevational view of the insert of the fishing weight of this invention.
Figure 5:
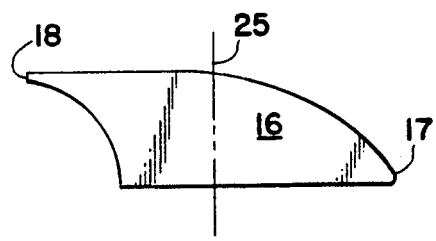
FIG. 5 is a side elevational view of the insert of the fishing weight of this invention.

The features of this invention are best understood by reference to the attached drawings.

The fishing weight of this invention has two components that fit snugly together and yet can be readily separated manually without the necessity for any tools. The body 10 of the fishing weight is shown as a bullet shaped article, although shape is not a critical feature of the invention. The smooth bullet shape or other curved bodies are preferred in that they are streamlined and can therefore be cast through the air or moved through the water with ease. Other shapes, e.g., cylinders, cubes, spheres, pyramids and the like, however, are considered operable within the context of this invention. The insert 16 is a thin flat article that is employed as a wedge to join the fishing line 19 into a slot 11 in the body 10 as a means of attaching the body 10 to the fishing line 14.

Body 10 has a central axis 14 running from the nose 12 to the bottom 13 of body 10. Coincident with axis 14 is a throughbore 15 extending from nose 12 to bottom 13. A slot 11 extends radially from bore 15 to the outside of body 10. The combination of bore 15 and slot 11 allows a fishing line 19 to be laid along axis 14 and bore 15 even though a lure is attached to the free end of the fishing line 19 and the remainder of the line 19 is rolled up in a reel.

Body 10 is made of a material which sinks rapidly in water, and therefore has a specific gravity greater than 1.0. The most suitable and convenient material for body 10 is lead, which is malleable, can be easily melted and cast into shapes, is reasonably inexpensive, and easy to work. The bottom 13 is shown here as being recessed or countersunk. This is not a critical feature; it merely makes it easier to handle with fingers, and it employs less volume of lead for a given weight.

Figure 6:
FIG. 6 is a top plan view of an alternate embodiment of the insert of this invention.
Figure 7:
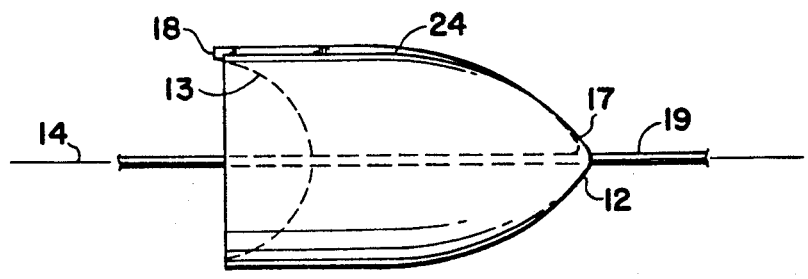
FIG. 7 is a side elevational view of the assembled fishing weight of this invention attached to a fishing line.

The insert 16 is a thin shaped piece of flat, resilient, slightly compressible material, preferably rubber or a thermoplastic material, such as polyolefin, polyester, polyamide, polyacetal, polycarbonate, or the like. The insert 16 is sized to fit snugly into slot 11 so as to jam a fishing line against the bottom of slot 11 or bore 15. In order to be able to jam insert 16 into slot 11 the width 21 of insert 16 should be slightly larger than the depth 22 of slot 11, thus leaving a little excess 24 of insert 16 outside of slot 11 when the insert 16 is fully pressed into slot 11. It is preferable for insert 16 to be bent about a lateral fold line or axis 25 as shown in FIG. 6 before it is pushed into slot 11 so as to provide a tighter fit. Furthermore, a short tail 18 of insert 16, extends rearwardly from body 10 so as to provide a catch for a fingernail to pry insert 16 out of slot 11 when desired.

The fishing weight of this invention can be employed as a sliding weight which slides along fishing line 19 by simply loosening the position of insert 16 in slot 11. On the other hand, by pushing insert 16 as deeply as possible into slot 11, the fishing weight can be tightly attached to line 19 at any selected position and will not slide along line 19. Thus, this invention has versatility and yet is a simple, uncomplicated device that can quickly be attached to or removed from a fishing line.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A fishing weight adapted for connection to a fishing line comprising an elongated body having forward and rearward end portions and a longitudinal central axis between said end portions and a through bore along said axis, said body being made of a material having a specific gravity greater than one and having an elongated radial slot with a constant width extending from said bore to the outside of said body for the complete length of said bore to permit insertion of such fishing line through said slot; and a resilient slightly compressible insert having a thickness, length and width substantially equal to the corresponding dimensions of and filling said slot to engage such fishing line and frictionally retain said weight in position on such fishing line, said insert including a single small tab extending axially beyond said rearward end portion to provide a fingernail catch for use in prying said insert out of said slot.

2. The fishing weight of claim 1 wherein said body is made of lead.

3. The fishing weight of claim 1 wherein said insert is made of a thermoplastic material.

4. The fishing weight of claim 1 wherein said insert is made of rubber.

5. The fishing weight of claim 1 wherein the width of said insert is slightly greater than the radial depth of said slot.

6. The fishing weight of claim 1 wherein said body is conical in shape.

7. A fishing weight comprising an elongated body having forward and rearward end portions and an outer surface and a longitudinal central axis and a through bore for a fishing line along said axis, said body being made of a material having a specific gravity greater than one and having an elongated radial slot with substantially the same width as and extending from said bore to said outer surface of said body throughout said bore, a resilient slightly compressible insert having a thickness, length and width substantially equal to corresponding dimensions of said slot, said insert filling said slot and being retained therein by friction, said insert including a single small tab extending axially beyond said rearward end portion to provide a fingernail catch for use in readily prying said insert from said slot.

8. The fishing weight of claim 7 wherein said body is formed of lead.

9. The fishing weight of claim 7 wherein said insert is formed of a thermoplastic material.

10. The fishing weight of claim 7 wherein said insert is formed of rubber.

11. The fishing weight of claim 7 wherein the width of said insert is slightly greater than the radial depth of said slot so that frictional retention of said insert in said slot is substantially enhanced.

12. The fishing weight of claim 7 wherein said body is conical in shape.

13. The fishing weight of claim 7 wherein said body is formed in conical shape having a recess therein to receive a tip of a bait therein.

14. The fishing weight of claim 7 wherein said insert has an exposed edge portion extending laterally of and beyond said outer surface of said body when a fishing line is located in said bore and said insert is tightly pressed into said slot.

15. The fishing weight of claim 7 wherein said insert before inserting into said slot is bent about a lateral axis through said insert so as to increase tightness of said insert therein.

* * * * *